(12) United States Patent
Wilson

(10) Patent No.: US 9,149,028 B2
(45) Date of Patent: Oct. 6, 2015

(54) CONTRACTING FISHING LURE

(71) Applicant: Joseph Wayne Wilson, Hudson, IA (US)

(72) Inventor: Joseph Wayne Wilson, Hudson, IA (US)

(73) Assignee: Joe Wilson Designs, LLC, Hudson, IA (US)

( * ) Notice: Subject to any disclaimer, the term of this patent is extended or adjusted under 35 U.S.C. 154(b) by 13 days.

(21) Appl. No.: 13/830,394

(22) Filed: Mar. 14, 2013

(65) Prior Publication Data

US 2014/0259868 A1    Sep. 18, 2014

(51) Int. Cl.
*A01K 85/02* (2006.01)
*A01K 85/00* (2006.01)

(52) U.S. Cl.
CPC .................. *A01K 85/00* (2013.01); *A01K 85/02* (2013.01)

(58) Field of Classification Search
CPC .............................. A01K 85/01; A01K 85/02
USPC .................. 43/42.24, 42.26, 44.87, 42.02
See application file for complete search history.

(56) References Cited

U.S. PATENT DOCUMENTS

| | | | |
|---|---|---|---|
| 559,293 A | 4/1896 | Kitchen | |
| 2,290,433 A * | 7/1942 | Jeffers | 43/42.26 |
| 2,572,608 A * | 10/1951 | Gabor | 43/42.24 |
| 2,722,766 A * | 11/1955 | Accetta | 43/42.24 |
| 2,769,268 A * | 11/1956 | Miller | 43/42.06 |
| 2,932,112 A * | 4/1960 | Graves, Jr. | 43/42.02 |
| 2,955,378 A * | 10/1960 | Burke | 43/42.28 |
| 2,979,849 A * | 4/1961 | Anderson, Jr. | 43/42.02 |
| 3,031,791 A | 5/1962 | Banks | |
| 3,224,133 A * | 12/1965 | Emard | 43/42.04 |
| 3,380,184 A * | 4/1968 | Fernandez | 43/26.2 |
| 3,544,204 A * | 12/1970 | Bienenfeld | 351/118 |
| 4,208,822 A * | 6/1980 | Bryant | 43/42.02 |
| 4,367,607 A * | 1/1983 | Hedman | 43/42.1 |
| 4,653,212 A * | 3/1987 | Pixton | 43/4.5 |
| 5,142,811 A * | 9/1992 | Freeman | 43/42.53 |
| 5,794,376 A * | 8/1998 | Frizzell et al. | 43/43.15 |
| 6,115,956 A | 9/2000 | Firmin | |
| 6,760,996 B1 * | 7/2004 | Pierson | 43/42.24 |
| 6,763,631 B1 * | 7/2004 | Santini | 43/42.36 |
| 6,843,017 B1 * | 1/2005 | Chambers, Sr. | 43/42.28 |
| 6,860,058 B2 * | 3/2005 | Ito | 43/42.28 |
| 7,913,445 B2 * | 3/2011 | St. Germain | 43/43.14 |
| 8,341,872 B2 * | 1/2013 | Ellard | 43/44.9 |
| 2010/0101137 A1 * | 4/2010 | MacDonald | 43/42.02 |
| 2011/0197493 A1 | 8/2011 | Kwong et al. | |
| 2012/0285069 A1 | 11/2012 | Baumgardner et al. | |

\* cited by examiner

*Primary Examiner* — Darren W Ark
*Assistant Examiner* — Michael Wang
(74) *Attorney, Agent, or Firm* — Luke Charles Holst

(57) ABSTRACT

The present invention relates in general to fishing lures, and more specifically, to a contracting fishing lure that provides life-like movement to mimic live bait. The fishing lure is configured so that when the fishing lure is retrieved (e.g., reeled in) or jigged by an angler, or the fishing line is pulled or twitched, the fishing lure transitions from a first non-contracted position to a second contracted position. The purpose of the invention is to provide a fishing lure that will successfully attract fish by displaying a unique action in the water.

14 Claims, 2 Drawing Sheets

CONTRACTING FISHING LURE

FIELD OF THE INVENTION

The present invention relates in general to fishing lures, and more specifically, to a contracting fishing lure that provides life-like movement to mimic live bait. The purpose of the invention is to provide a fishing lure that will successfully attract fish by displaying a unique action in the water.

BACKGROUND OF THE INVENTION

A fishing lure is an artificial object tied onto the end of a fishing line and used to attract fish. Used in conjunction with a fishing rod and fishing reel, a skilled angler continuously casts and retrieves the fishing lure to mimic a swimming or popping action as it moves through the water. An angler may also utilize a jigging action wherein the fishing lure is dropped into the water and vertically moved, or jigged, up and down via the attached fishing line. The fishing lure is designed to resemble the prey of a particular type of fish, such as earthworms, caterpillars, grubs, frogs, crawfish, minnows, lizards, insects, etc. The color, appearance, vibration, and movement of the fishing lure as it travels through the water attract fish attention, causing fish to bite the lure. Fishing lures are further equipped with a single, double, or treble hook(s) of various sizes, shapes, and spacing. The hooks snag the fish after the fishing lure has been bitten or swallowed by the fish.

Historically, fish hooks were carved by ancient man out of bone or molded out of bronze. The Greek and Roman civilizations advocated fishing for sport, creating fly-fishing lures of feathers, bronze, horsehair, and wild boar bristles. In the United States during the early 1800s, fishing lures were made by individual craftsmen whittling wood or pounding metal into a shape that resembled live bait. However, the unnatural movement of these lures as they traveled through the water left much to be improved upon. Manufacturing of fishing lures began to slowly evolve from individual craftsmen to commercial ventures during the late 1800s to early 1900s. More recently, the development of soft plastic compositions and injection molding techniques have produced fishing lures that more closely resemble live bait and their movements. Such lures may incorporate dyes, metallic flakes, or even scents. Soft plastic baits encompass a variety of different lures, one common example being a tube lure. Generally, a tube lure comprises a soft plastic tube with tentacles extending from the tail to resemble a crawfish. A hook is typically pierced through the tube lure, after which an angler casts and retrieves the lure utilizing a twitching motion to mimic a live crawfish swimming through the water. While such a lure has its own advantages, a desire remains to develop still further tube lures that incorporate unique life-like movements while offering a concealed position for the hook(s) to attract more fish and make it easier to set the lure in the fish's mouth.

BRIEF SUMMARY OF THE INVENTION

Therefore, it is a principal object, feature, and/or advantage of the present invention to overcome the aforementioned deficiencies in the art and provide a fishing lure that incorporate unique life-like movements to more closely resemble live bait.

Another object, feature, and/or advantage of the present invention is to provide a fishing lure that offers a concealed position for a single, double, or treble hook(s).

A further object, feature, and/or advantage of the present invention is to provide a fishing lure with multiple-attractive aspects (i.e., color, light, turbulence in the water, scent, undulation, vibration) when pulled through the water.

Another object, feature, and/or advantage of the present invention is to provide a fishing lure that easily attaches to a fishing line.

A further object, feature, and/or advantage of the present invention is to provide a fishing lure that is easy to manufacture and easy to use.

A still further object, feature, and/or advantage of the present invention is to provide a method of catching fish using a fishing lure that provides life-like movement to mimic live bait.

A still further object, feature, and/or advantage of the present invention is to provide a fishing lure that may be used when casting or trolling.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a tubular-type fishing lure is formed having a head portion, body portion, and tail portion. A channel extends longitudinally through the lure, configured for water to flow through the lure by passing through the body portion and exiting through the tail portion. The head portion may be comprised of a lead sinker or weight, and may be rounded in shape, flat, tapered to a point, or shaped like a bullet. The head portion may be inserted into one end of the body portion so that the head portion and body portion are integral and do not separate when the fishing lure is cast and retrieved, or jigged. The head portion may further comprise a circular groove to assist in retaining it inside the end of the body portion. The body portion may have a series of flexible ridges extending around a circumference of the body portion. The tail portion may be in the form of tentacles, a sickle, a plurality of segments, a plurality of fins, a plurality of elongated streamers forming a skirt, or any combination of the foregoing. The fishing lure is configured so that a fishing line may be drawn through a hole in the head portion, extend through the channel of the body portion, and continue beyond the tail portion and attach to a fishing hook. The fishing lure is further configured so that when the fishing lure is retrieved (e.g., reeled in) or jigged by an angler, or the fishing line is pulled or twitched, the fishing lure contracts in shape by the series of flexible ridges to mimic the life-like movement of live bait to attract fish.

According to another aspect of the present invention, a tubular-type fishing lure is formed having a head portion, body portion, and tail portion. A channel extends longitudinally through the lure, configured for water to flow through the lure by passing through the body portion and exiting through the tail portion. The head portion may be comprised of a lead sinker or weight, and may be rounded in shape, flat, tapered to a point, or shaped like a bullet. The head portion may be inserted into one end of the body portion so that the head portion and body portion are integral and do not separate when the fishing lure is cast and retrieved, or jigged. The head portion may further comprise a circular groove to assist in retaining it inside the end of the body portion. The body portion may have a series of longitudinal cuts extending along a portion of the length of the body portion that form a plurality of longitudinal strips. The tail portion may be in the form of tentacles, a sickle, a plurality of segments, a plurality of fins, a plurality of elongated streamers forming a skirt, or any combination of the foregoing. The fishing lure is configured so that a fishing line may be drawn through a hole in the head portion, extend through the channel of the body portion, and continue beyond the tail portion and attach to a fishing hook. The fishing lure is further configured so that when the fishing lure is retrieved (e.g., reeled in) or jigged by an angler, or the fishing line is pulled or twitched, the plurality of longitudinal strips extend outwards and the fishing lure contracts in overall length to mimic the life-like movement of live bait to attract fish.

According to a further aspect of the present invention a method of fishing using a fishing lure is provided. The method includes providing a fishing rod and reel with a fishing line. The method further includes providing a contracting fishing lure. The method additionally includes attaching the fishing lure to the fishing line and concealing a fishing hook in a tail portion of the fishing lure. The method further includes casting and retrieving the fishing lure in a manner so that the fishing lure contracts to mimic the life-like movement of live bait to attract fish.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIG. 1 is an exploded assembly view of a fishing lure of the present invention.

FIG. 2 is a non-contracted view of the fishing lure of FIG. 1.

FIG. 3 is a contracted view of the fishing lure of FIG. 1.

FIG. 4 is an exploded assembly view of a fishing lure of the present invention.

FIG. 5 is a non-contracted view of the fishing lure of FIG. 4.

FIG. 6 is a contracted view of the fishing lure of FIG. 4.

DETAILED DESCRIPTION OF THE INVENTION

Figure 1:
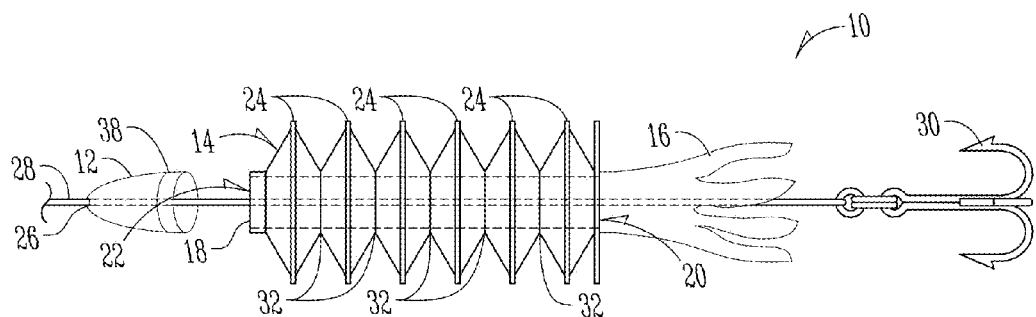
FIGS. 1-6 represent examples of contracting fishing lures of the present invention, and a method of fishing utilizing the present invention.

FIG. 1 illustrates an exploded assembly view of a contracting fishing lure (10) of the present invention. The fishing lure (10) has a head portion (12), a tubular body portion (14), and a tail portion (16). The tubular body portion (14) has a first open end (18) and an opposite second open end (20) exiting into the tail portion (16). A channel (22) extends longitudinally through the tubular body portion (14) from the first open end (18) to the second open end (20). The channel (22) is configured for water to flow into the first open end (18), through the tubular body portion (14), and exit the second open end (20) into the tail portion (16). The head portion (12) may be comprised of a lead sinker or weight, and may be rounded in shape, flat, tapered to a point, or shaped like a bullet. The head portion (12) also includes a hole (26) extending through the head portion (12). The tubular body portion (14) may have a series of flexible ridges (24) extending around a circumference of the tubular body portion (14). The tail portion (16) may be in the form of tentacles, a sickle, a plurality of segments, a plurality of fins, a plurality of elongated streamers forming a skirt, or any combination of the foregoing. A fishing line (28) or lead line is drawn through the hole (26) in the head portion (12), through the first open end (18) of the tubular body portion (14), further through the channel (22) of the tubular body portion (14), continued through the second open end (20), and extended beyond the tail portion (16) where it is attached to a fishing hook (30) (e.g., by a fishing knot). The fishing hook (30) may be a single, double, or treble hook(s). The fishing hook (30) may also be weighted to assist in vertical jigging.

The first open end (18) of the tubular body portion (14) may be smaller in diameter than the second open end (20). The head portion (12) may be partially or fully inserted into the first open end (18) of the tubular body portion (14) so that the head portion (12) and the tubular body portion (14) are integral and do not separate when the fishing lure (10) is cast and retrieved, or jigged. The smaller diameter of the first open end (18) of the tubular body portion (14) allows it to fit tightly around the head portion (12) for a secure fit and seal. The head portion (12) may further comprise a circular groove (38) to assist in securing and sealing the first open end (18) of the tubular body portion (14) around the head portion (12). Additionally, the fishing lure (10) of the present invention may be used as a top water surface lure by removing the head portion (12). A person skilled in the art will recognize that various sizes of tubular body portions, weights, and hooks may be fabricated and utilized for different types and sizes of fish.

Figure 2:
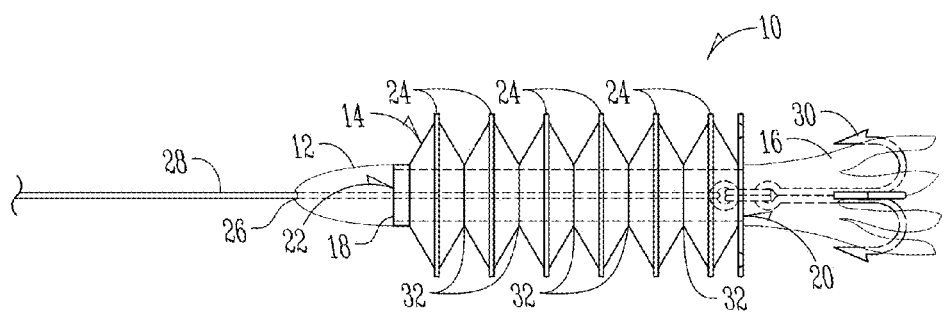
Figure 3:
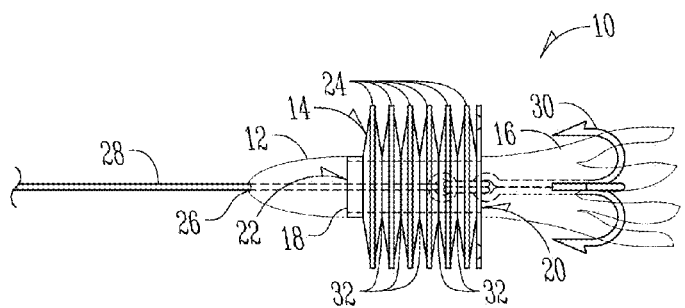

As illustrated in FIG. 2, the fishing hook (30) may extend outside a diameter of the tubular body portion (14). The fishing hook (30) may also be concealed by the tail portion (16) so that the fishing lure (10) appears more life-like. The fishing lure (10) is configured so that when it is cast and retrieved (e.g., reeled in) by an angler, the head portion (12) leads and water flows through the channel (22) of the tubular body portion (14) in a direction opposite to the direction in which the fishing (10) lure travels through the water. While lying in the water and the fishing line (28) is slack, the fishing lure (10) assumes a first non-contracted position as depicted in FIG. 2. While moving through the water after tension or force has been placed on the fishing line (28) (e.g., the fishing lure (10) is reeled in by the angler, or the fishing line (28) is pulled, twitched, jerked, or yanked), the fishing lure (10) transitions to a second contracted position where the series of flexible ridges (24) contract or squeeze together, as illustrated in FIG. 3. When the fishing line (28) becomes slack once again, the fishing lure (10) returns to the first non-contracted position as depicted in FIG. 2, thus, mimicking the life-like movement of live bait to attract fish. Because the fishing lure (10) fills with water as it enters the water, water rushes in and out of the fishing lure (10) via the transition from the first non-contracted position to the second contracted position.

The tubular body portion (14) and the tail portion (16) may be formed separately or integrally from a non-toxic, silicone, rubber, and/or plastic material, such as a vinyl plastisol (polyvinyl chloride) dispersion grade resin in a suitable solvent or plasticizer. The plastic material may be hard and/or soft, flexible, non-transparent, partially transparent, completely transparent, contain various colors, patterns, and/or metallic flakes. The plastic material may also be of varying thicknesses throughout the fishing lure (10). For instance, the tubular body portion (14) may include peaks (30) and valleys (32), resembling, for example, an accordion. The plastic material at the peaks (30) and valleys (32) may be thinner as compared to the plastic material forming the rest of the fishing lure (10). Thus, the thinner plastic material at the peaks (30) and valleys (32) increases flexibility in these areas and assists in enabling the fishing lure (10) to contract to mimic the life-like movement of live bait. Moreover, fragrances (e.g., cod liver oil, fish oil, fish attractant tablets, and gel scents) may be incorporated and/or applied to the fishing lure of the present invention to further attract fish.

Figure 4:
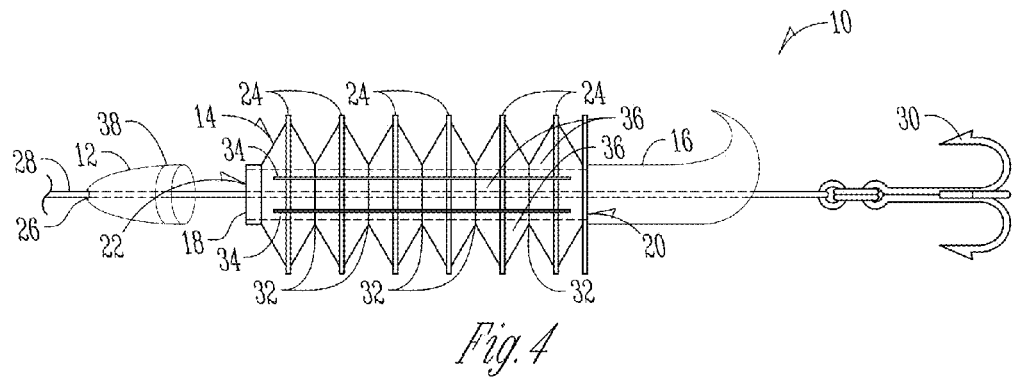

FIG. 4 illustrates an exploded assembly view of another aspect of the present invention. The contracting fishing lure (10) has a head portion (12), a tubular body portion (14), and a tail portion (16). The tubular body portion (14) has a first open end (18) and an opposite second open end (20) exiting into the tail portion (16). A channel (22) extends longitudinally through the tubular body portion (14) from the first open end (18) to the second open end (20). The channel (22) is configured for water to flow into the first open end (18), through the tubular body portion (14), and exit the second open end (20) into the tail portion (16). The head portion (12) may be comprised of a lead sinker or weight, and may be rounded in shape, flat, tapered to a point, or shaped like a bullet. The head portion (12) also includes a hole (26) extending through the head portion (12). The tubular body portion (14) may have a series of flexible ridges (24) extending around a circumference of the tubular body portion (14). The tubular body portion (14) may also have a series of longitudinal cuts (34) extending along a portion of a length of the tubular body portion (14). A plurality of longitudinal strips (36) may extend along a portion of the length of the tubular body portion (14) and is formed by the series of longitudinal cuts (34). The tail portion (16) may be in the form of tentacles, a sickle, a plurality of segments, a plurality of fins, a plurality of elongated streamers forming a skirt, or any combination of the foregoing. A fishing line (28) or lead line is drawn through the hole (26) in the head portion (12), through the first open end (18) of the tubular body portion (14), further through the channel (22) of the tubular body portion (14), continued through the second open end (20), and extended beyond the tail portion (16) where it is attached to a fishing hook (30). The fishing hook (30) may be a single, double, or treble hook(s). The fishing hook (30) may also be weighted to assist in vertical jigging.

The first open end (18) of the tubular body portion (14) may be smaller in diameter than the second open end (20). The head portion (12) may be partially or fully inserted into the first open end (18) of the tubular body portion (14) so that the head portion (12) and the tubular body portion (14) are integral and do not separate when the fishing lure (10) is cast and retrieved, or jigged. The smaller diameter of the first open end (18) of the tubular body portion (14) allows it to fit tightly around the head portion (12) for a secure fit and seal. The head portion (12) may further comprise a circular groove (38) to assist in securing and sealing the first open end (18) of the tubular body portion (14) around the head portion (12). Additionally, the fishing lure (10) of the present invention may be used as a top water surface lure by removing the head portion (12). A person skilled in the art will recognize that various sizes of tubular body portions, weights, and hooks may be fabricated and utilized for different types and sizes of fish.

Figure 5:
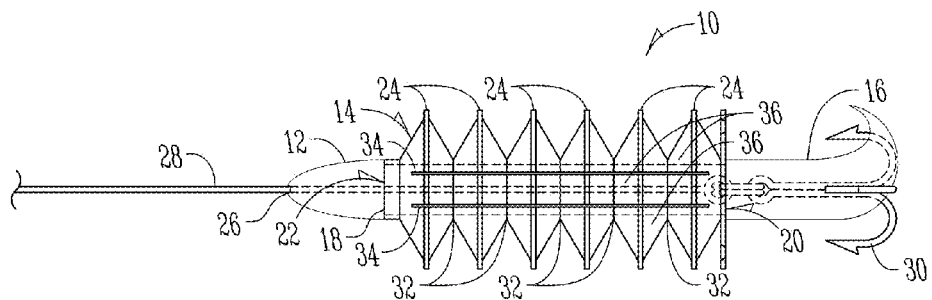
Figure 6:
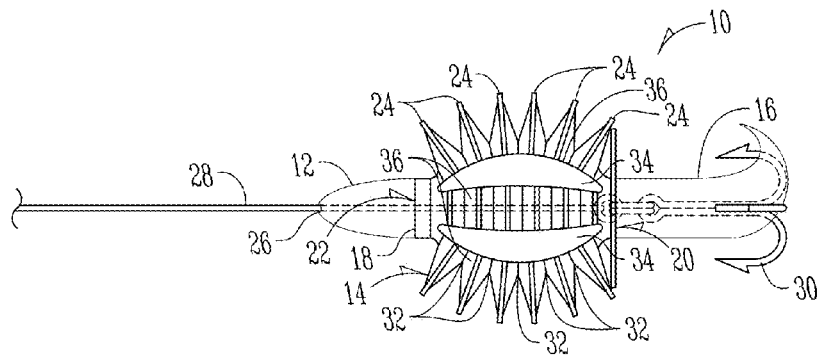

As illustrated in FIG. 5, the fishing hook (30) may extend outside a diameter of the tubular body portion (14). The fishing hook (30) may also be concealed by the tail portion (16) so that the fishing lure (10) appears more life-like. The fishing lure (10) is configured so that when it is cast and retrieved (e.g., reeled in) by an angler, the head portion (12) leads and water flows through the channel (22) of the tubular body portion (14) in a direction opposite to the direction in which the fishing (10) lure travels through the water. While lying in the water and the fishing line (28) is slack, the fishing lure (10) assumes a first non-contracted position as depicted in FIG. 5. While moving through the water after tension or force has been placed on the fishing line (28) (e.g., the fishing lure (10) is reeled in by the angler, or the fishing line (28) is pulled, twitched, jerked, or yanked), the fishing lure (10) transitions to a second contracted position where the plurality of longitudinal strips (36) extend outwards and the overall length of the fishing lure (10) shortens, as illustrated in FIG. 6. When the fishing line (28) becomes slack once again, the fishing lure (10) returns to the first non-contracted position as depicted in FIG. 5, thus, mimicking the life-like movement of live bait to attract fish.

According to a further aspect of the present invention a method of fishing using a contracting fishing lure is provided. The method includes providing a fishing rod and reel. The method further includes providing a fishing line with one end of the fishing line attached to the rod and reel and an opposite second free end. The method further includes providing the fishing lure as explained previously with respect to FIG. 1-6. The second free end of the fishing line is attached to the fishing hook as illustrated in FIG. 1 or 4. The fishing hook is subsequently concealed in the tail portion of the fishing lure. The method next involves placing the fishing lure into a body of water by use of casting with a fishing rod and reel, or dropping the fishing lure into the water for jigging. An angler retrieves or jigs the fishing lure in a manner so that the fishing lure contracts to mimic the appearance of live bait to attract fish. This manner may include reeling in the fishing line, or pulling, twitching, jerking, or yanking the fishing line. The angler continually retrieves and casts, or jigs, the fishing lure until the desired amount of fish have been caught. Additional steps may also be incorporated into the method such as applying or incorporating fragrances (e.g., cod liver oil, fish oil, fish attractant tablets, and gel scents) to the fishing lure to further attract fish.

The contracting fishing lure of the present invention and method of fishing using the contracting fishing lure are universally applicable to fishing rods and reels of all shapes and sizes, makes, models, and manufacturers. Furthermore, while intended for large and smallmouth bass and northern pike, the contracting fishing lure of the present invention may be used for fishing all manner of freshwater and saltwater fish. Although the invention has been described and illustrated with respect to preferred aspects thereof, it is not to be so limited since changes and modifications may be made therein which are within the full intended scope of the invention.

What is claimed is:

1. A contracting fishing lure, comprising:
   a tubular body portion, wherein the tubular body portion comprises a first open end and an opposite second open end;
   a removable head portion, wherein the head portion is adjacent the first open end of the tubular body, the head portion comprising a sinker or weight, a groove extending around the head portion, wherein the groove is configured to secure and seal the first open end of the tubular body portion to the head portion, and further wherein the first open end of the tubular body portion is smaller in diameter than the second open end;
   a channel extending longitudinally through the tubular body portion;
   a series of flexible ridges and valleys extending around a circumference of the tubular body portion;
   a tail portion adjacent the second open end of the tubular body portion and opposite the head portion;
   a fishing hook;
   a fishing line, wherein the fishing line is drawn through a hole in the head portion, further drawn through the channel extending longitudinally through the tubular body portion, continued through the tail portion, and attached to the fishing hook via a means of attachment;
   a non-contracted first position, wherein the tubular body portion is in the non-contracted first position when the fishing line is slack;

a contracted second position, wherein the tubular body portion is in the contracted second position under action of water pressure when the fishing line is reeled in by an angler; and a significant difference in overall length of the fishing lure between the non-contracted first position and contracted second position to attract the attention of fish;

wherein the fishing lure transitions from the non-contracted first position to the contracted second position and back to the non-contracted first position as the fishing lure is drawn through water to mimic the appearance of live bait to attract fish;

wherein the means of attaching the fishing line to the fishing hook extends farther into the tubular body portion while in the contracted second position than in the non-contracted first position;

wherein the fishing lure transitions from the first position to the second position before a fish bites the fishing lure;

wherein the fishing lure has a first configuration with the head portion present and a second configuration with the head portion removed such that the fishing lure is drawn through water as a top water surface lure.

2. The contracting fishing lure of claim 1, wherein the tubular body portion is a flexible plastic material.

3. The contracting fishing lure of claim 2, wherein the tubular body portion comprises patterns and/or metallic flakes.

4. The contracting fishing lure of claim 3, wherein the tail portion is selected from the group consisting in the form of tentacles, a sickle, a plurality of segments, a plurality of fins, a plurality of elongated streamers, and combinations thereof.

5. The contracting fishing lure of claim 4, wherein the contracting fishing lure comprises a fragrance to further attract fish.

6. The contracting fishing lure of claim 1, wherein the tail portion is integrally formed with the tubular body portion.

7. The contracting fishing lure of claim 1, wherein the fishing hook is concealed by the tail portion.

8. The contracting fishing lure of claim 1, wherein the second position comprises the series of flexible ridges contracting together, further wherein material comprising the tubular body portion is thinner at the flexible ridges and valleys.

9. The contracting fishing lure of claim 1, further comprising:
a series of longitudinal cuts extending along a portion of a length of the tubular body portion; and
a plurality of longitudinal strips extending along a portion of the length of the tubular body portion and formed by the series of longitudinal cuts;
wherein the second position comprises the plurality of longitudinal strips extending outwards and the overall length of the fishing lure shortening.

10. A contracting fishing lure, comprising:
a tubular body portion, wherein the tubular body portion comprises a first open end and an opposite second open end;
a removable head portion, wherein the head portion is adjacent the first open end of the tubular body;
a channel extending longitudinally through the tubular body portion;
a series of flexible ridges and valleys extending around a circumference of the tubular body portion;
a tail portion adjacent the second open end of the tubular body portion and opposite the head portion;
a fishing hook;

a fishing line, wherein the fishing line is drawn through a hole in the head portion, further drawn through the channel extending longitudinally through the tubular body portion, continued through the tail portion, and attached to the fishing hook via a means of attachment;

a non-contracted first position, wherein the tubular body portion is in the non-contracted first position when the fishing line is slack;

a contracted second position, wherein the tubular body portion is in the contracted second position under action of water pressure when the fishing line is reeled in by an angler; and a significant difference in overall length of the fishing lure between the non-contracted first position and contracted second position to attract the attention of fish;

wherein the contracted second position comprises the series of flexible ridges contracting together;

wherein the fishing lure transitions from the non-contracted first position to the contracted second position and back to the non-contracted first position as the fishing lure is drawn through water to mimic the appearance of live bait to attract fish;

wherein the means of attaching the fishing line to the fishing hook extends farther into the tubular body portion while in the contracted second position than in the non-contracted first position;

wherein the fishing lure transitions from the non-contacted first position to the contracted second position before a fish bites the fishing lure;

wherein the tubular body portion is a flexible plastic material;

wherein the tubular body portion resembles an accordion;

wherein the tubular body portion comprises colors, patterns, and/or metallic flakes;

wherein the tail portion is integrally formed with the tubular body portion;

further wherein the tail portion is selected from the group consisting in the form of tentacles, a sickle, a plurality of segments, a plurality of fins, a plurality of elongated streamers, and combinations thereof;

wherein the tail portion conceals the fishing hook;

wherein the series of flexible ridges are in uniform longitudinal alignment when the fishing lure is in the non-contracted first position and the contracted second position;

wherein the series of flexible valleys are in uniform longitudinal alignment when the fishing lure is in the non-contracted first position and the contracted second position;

wherein material comprising the tubular body portion is thinner at the flexible ridges and valleys;

wherein the head portion comprises a sinker or weight;

wherein the first open end of the tubular body portion is smaller in diameter than the second open end;

wherein the head portion comprises a groove around the head portion, wherein the groove is configured to seal the first open end of the tubular body portion around the head portion;

wherein the fishing lure has a first configuration with the head portion present and a second configuration with the head portion removed such that the fishing lure is drawn through water as a top water surface lure.

11. The contracting fishing lure of claim 10, further comprising:
a series of longitudinal cuts extending along a portion of a length of the tubular body portion; and a plurality of longitudinal strips extending along a portion of the length of the tubular body portion and formed by the series of longitudinal cuts;

wherein the second position comprises the plurality of longitudinal strips extending outwards and the overall length of the fishing lure shortening.

12. A method of fishing using a contracting fishing lure, comprising:
  providing a fishing rod;
  providing a fishing line with a first end attached to the fishing rod and a second free end;
  providing a contracting fishing lure, the contracting fishing lure comprising:
   a) a removable head portion comprising a hole, wherein the head portion is a weight or sinker, and a groove extending around the head portion;
   b) a tubular body portion, wherein the tubular body portion comprises a first open end and an opposite second open end, further wherein the head portion is adjacent the first open end of the tubular body, wherein the groove is configured to secure and seal the first open end of the tubular body portion to the head portion, and further wherein the first open end of the tubular body portion is smaller in diameter than the second open end;
   c) a channel extending longitudinally through the tubular body portion;
   d) a series of flexible ridges and valleys extending around a circumference of the tubular body portion;
   e) a tail portion adjacent the second open end of the tubular body portion and opposite the head portion;
   f) a non-contracted first position, wherein the tubular body portion is in the non-contracted first position when the fishing line is slack;
   g) a contracted second position, wherein the tubular body portion is in the contracted second position under action of water pressure when the fishing line is reeled in by an angler;
   h) a significant difference in overall length of the fishing lure between the non-contracted first position and contracted second position to attract the attention of fish;
   j) wherein the fishing lure has a first configuration with the head portion present and a second configuration with the head portion removed such that the fishing lure is drawn through water as a top water fishing surface lure;
  drawing the second free end of the fishing line through the hole in the head portion;
  drawing the second free end of the fishing line through the first open end of the tubular body portion, further through the channel extending longitudinally through the tubular body portion, and continued through the opposite second open end of the tubular body portion;
  attaching the second free end of the fishing line to a fishing hook via a means of attachment;
  concealing the fishing hook in the tail portion of the contracting fishing lure;
  placing the contracting fishing lure into water; and
  retrieving the contracting fishing lure in a manner so that when the fishing line is retrieved the fishing lure transitions from the non-contracted first position to the contracted second position and back to the non-contracted first position as the fishing lure is drawn through water to mimic the appearance of live bait to attract fish;
  wherein the means of attaching the fishing line to the fishing hook extends farther into the tubular body portion while in the contracted second position than in the non-contracted first position;
  wherein the fishing lure transitions from the first position to the second position before a fish bites the fishing lure.

13. The method of claim 12, wherein the second position comprises the series of flexible ridges contracting together.

14. The method of claim 12, wherein the tubular body portion comprises a series of longitudinal cuts extending along a portion of a length of the tubular body portion, a plurality of longitudinal strips extending along a portion of the length of the tubular body portion and formed by the series of longitudinal cuts, and wherein the second position comprises the plurality of longitudinal strips extending outwards and the overall length of the fishing lure shortening.

* * * * *